O. E. HUNT.
SHIFTER MECHANISM.
APPLICATION FILED AUG. 30, 1915.
1,259,990.
Patented Mar. 19, 1918.
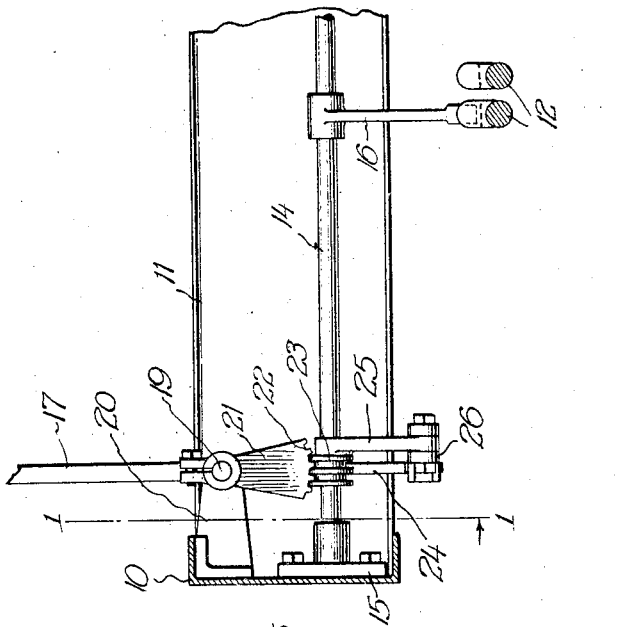
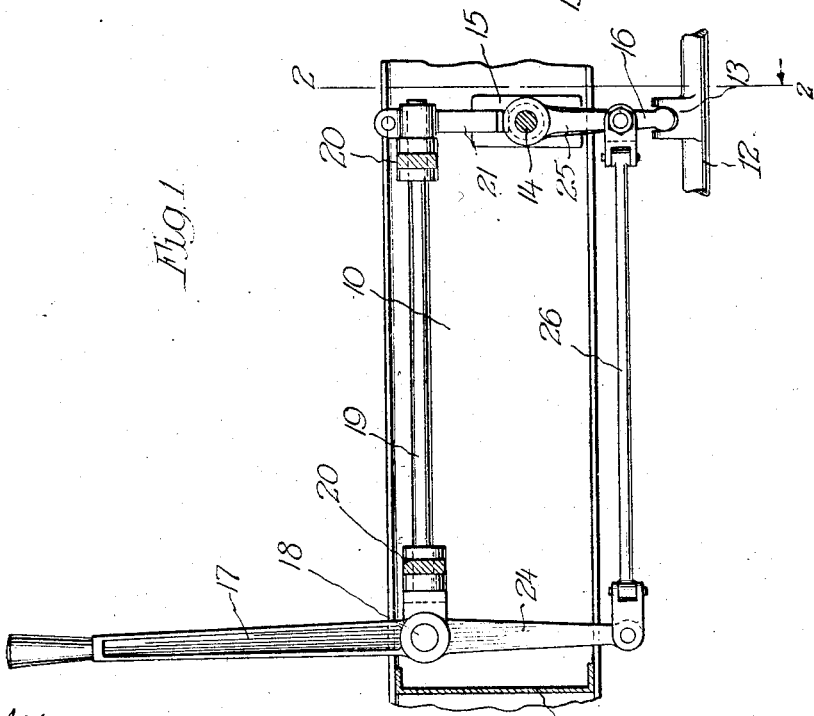
Witnesses:
E. R. Barrett.
A. K. Speer.
Inventor:
Ormond E. Hunt,
by Milton Tibbetts,
Atty.

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

SHIFTER MECHANISM.

1,259,990.   Specification of Letters Patent.   Patented Mar. 19, 1918.

Application filed August 30, 1915. Serial No. 48,022.

*To all whom it may concern:*

Be it known that I, ORMOND E. HUNT, a citizen of the United States, and resident of Detroit, Wayne county, State of Michigan, have invented certain new and useful Improvements in Shifter Mechanism, of which the following is a specification.

This invention relates to motor vehicles, and particularly to the gear shifter mechanism thereof.

The invention is more especially adapted to what is well known as the selective type of gearing, and it has special application where the manually operated gear shift lever is arranged on the vehicle chassis forwardly of the gear box.

The salient object of the invention is to provide a simple and efficient mechanism of the above description. It is believed that this and the other objects and advantages of the invention will be clearly apparent from the following description taken in connection with the drawings which form a part of this specification, and in which:

Figure 1 is a longitudinal section on the line 1—1 of Fig. 2 of part of a motor vehicle embodying this invention; and Fig. 2 is a transverse section substantially on the line 2—2 of Fig. 1.

Referring to the drawings, 10 represents the side bars and 11 one of the cross bars of a motor vehicle frame, and it will be understood that the usual transmission gearing may be mounted in any suitable way upon this frame. The gearing is not shown in the drawing, but two gear shifter devices 12 are illustrated and it will be understood that each of these devices slides or otherwise operates one of the shifting elements of the gears. It is usual to operate these shifter devices separately, and the present invention contemplates a mechanism for doing so.

The devices 12 are shown in the form of rods arranged side by side and adapted to be moved axially, and the notches 13 are in line as shown in the figures when the rods 12 are in neutral position. A rock shaft 14 is suitably supported in the frame of the vehicle so that it may slide axially and also rock about its own axis. Brackets 15 are suitably secured to the frame side member 10 for this purpose. Rock shaft 14 is provided with a gear shifting arm 16 which is adapted to enter, one at a time, the slots or notches 13 in the shifter devices 12. Thus, the rock shaft 14 may be moved axially to position the lower end of the arm 16 in the proper notch 13, and then the shaft may be rocked to shift the particular device 12 to thereby change the position of the gears.

A gear shift lever 17 is suitably mounted on the frame of the vehicle so that it may swing both forward and back and laterally. The lateral movement of the gear shift lever is adapted to select the desired shifter device 12 and the forward and back movement of the lever 17 is adapted to shift said device 12 from its neutral position to either of its gear engaging positions. The lever 17 is pivotally supported as at 18 upon the forward end of a second rock shaft 19, said shaft being mounted in suitable brackets 20 on one of the frame side members 10. The rear end of this second rock shaft 19 is provided with a segmental arm 21 having teeth 22 which are adapted to mesh with a circular rack 23 formed directly beneath it on the rock shaft 14. From this it will be seen that the lateral swinging movement of the shift lever 17 carries with it the second rock shaft 19 whereby the arm 21 causes an axial shifting movement of the rock shaft 14. Thus the arm 16 is positioned in the desired notch 13 by this lateral swinging movement of the shift lever 17.

The lever 17 extends below the pivot pin 18 in the form of an arm 24 and the rock shaft 14 has an operating arm 25 extending downwardly therefrom, and a connecting rod 26 connects the lower extremities of said arms 24 and 25. Thus, the forward and back swinging movement of the shift lever 17 will cause a reciprocation of the connecting rod 26 which in turn will cause the rock shaft 14 to rock and thereby move the shifter device 12 with which the arm 16 happens to be engaged.

It is believed that the operation of the device will be clearly understood from the above description, and it will be further understood that while but one embodiment of the invention is shown herein, various changes and modifications may be made without departing from the scope of the invention.

Having thus described my invention, what

I claim and desire to secure by Letters Patent is:—

1. In a gear shifting mechanism, in combination, a lever adapted to swing forward and back and laterally, a rock shaft having a gear shifting arm, means operated by the lever in its lateral swinging movement and connected to shift said rock shaft axially, and a rod reciprocated by said lever in its back and forth shifting movement and connected to rock said rock shaft.

2. In a gear shifting mechanism, in combination, a lever adapted to swing forward and back and laterally, a rock shaft having a gear shifting arm, a shaft oscillated by the lever in its lateral swinging movement and connected to shift said rock shaft axially, and means operated by said lever in its back and forth shifting movements and connected to rock said rock shaft.

3. In a gear shifting mechanism, in combination, a lever adapted to swing forward and back and laterally, a rock shaft having an arm by which it may be rocked and also having rack teeth, a shaft oscillated by the lever in its lateral swinging movement and having a segment meshing with said rack teeth for shifting the rock shaft axially, and means operated by said lever in its forward and back shifting movement and connected to rock said rock shaft.

4. In a gear shifting mechanism, in combination, a lever adapted to swing forward and back and laterally, a rock shaft having an arm by which it may be rocked and also having rack teeth, a shaft oscillated by the lever in its lateral swinging movement and having a segment meshing with said rack teeth for shifting the rock shaft axially, and a rod reciprocated by said lever in its forward and back shifting movement and connected to rock said rock shaft.

5. The combination with the side bars of a motor vehicle frame, of a transversely extending rock shaft supported by said frame and having means connected to operate the gear shifter devices, a shift lever mounted on said frame forwardly of said rock shaft, and connections from said shift lever to said rock shaft for moving said rock shaft axially and for rocking it.

6. The combination with the frame of a motor vehicle including side bars, of a transversely extending rock shaft supported in the frame and having means for operating the gear shifter devices, a second rock shaft and a reciprocating rod connected to move the first said rock shaft axially and about its axis, and a shift lever connected to the second rock shaft and to said reciprocating rod for operating them.

7. In a gear shifting mechanism, in combination, a lever adapted to swing forward and back and laterally, a rock shaft having a gear shifting arm, a shaft oscillated by the lever in its lateral swinging movement and connected to shift said rock shaft axially, and a rod reciprocated by said lever in its forward and back movement and connected to rock said rock shaft.

8. In a gear shifting mechanism, in combination, a lever adapted to swing forward and back and laterally, a rock shaft having a gear shifting arm, and an operating arm, a shaft oscillated by the lever in its lateral swinging movement and connected to shift said rock shaft axially, and a rod reciprocated by said lever in its forward and back movement and connected to said operating arm to rock said rock shaft.

9. In a gear shifting mechanism, in combination, a plurality of shifter devices arranged side by side, a rock shaft having an arm coöperating to shift either of said devices separately, said rock shaft being adapted to move endwise to connect with one or another of said devices, a shift lever mounted to swing in two directions, a rock shaft operated by the lever in one of its swinging movements to move the first rock shaft axially, and connections for rocking the first rock shaft by said lever in the other of its swinging movements.

10. In a gear shifting mechanism, in combination, a plurality of shifter devices arranged side by side, a rock shaft having an arm coöperating to shift either of said devices separately, said rock shaft being adapted to move endwise to connect with one or another of said devices, a shift lever mounted to swing in two directions, a rock shaft operated by the lever in one of its swinging movements and connected to move the first rock shaft axially, and a rod connecting said lever and said first rock shaft for rocking the latter by the other swinging movement of the lever.

11. In a gear shifting mechanism, in combination, a plurality of shifter devices, a rock shaft having an arm coöperating therewith, a shift lever mounted to rock about an axis parallel to said rock shaft, and connections comprising another rock shaft and a rod for both shifting the first said rock shaft axially and rocking it to shift said devices.

12. In a shifter mechanism, in combination, a plurality of shifter devices, a rock shaft having an arm coöperating therewith, said rock shaft being mounted to move axially, a shift lever mounted to rock about an axis parallel to said rock shaft, a second rock shaft oscillated by said shift lever to move said first rock shaft axially and means connected to said shift lever for oscillating said first rock shaft.

13. In a shifter mechanism, in combination, a plurality of shifter devices, a shifter arm coöperating therewith, a shift lever mounted to swing forward and backward and laterally and connections between said shifter arm and said lever whereby said arm is moved into engagement with the desired shifter device upon the movement of said shift lever in one path of movement and is caused to move said shifter device upon the movement of said shift lever in the other path of movement.

14. In a mechanism of the class described, in combination, a plurality of shifter devices, a rock shaft having an arm coöperating therewith, a shift lever mounted to swing in two paths of movement one parallel to and the other at right angles to said rock shaft, and connections between said rock shaft and said lever for shifting said rock shaft axially when the lever is moved in one path and for rocking said rock shaft to shift said devices when the lever is moved in the other path.

In testimony whereof I affix my signature in the presence of two witnesses.

ORMOND E. HUNT.

Witnesses:
ELSIE E. INSLEE,
A. K. SPEER.

Copies of this patent may be obtained for five cents each, by addressing the "Commissioner of Patents, Washington, D. C."